Jan. 21, 1930. J. L. SCHWARTZ 1,744,417
SIDEWALK BICYCLE
Filed March 9, 1927
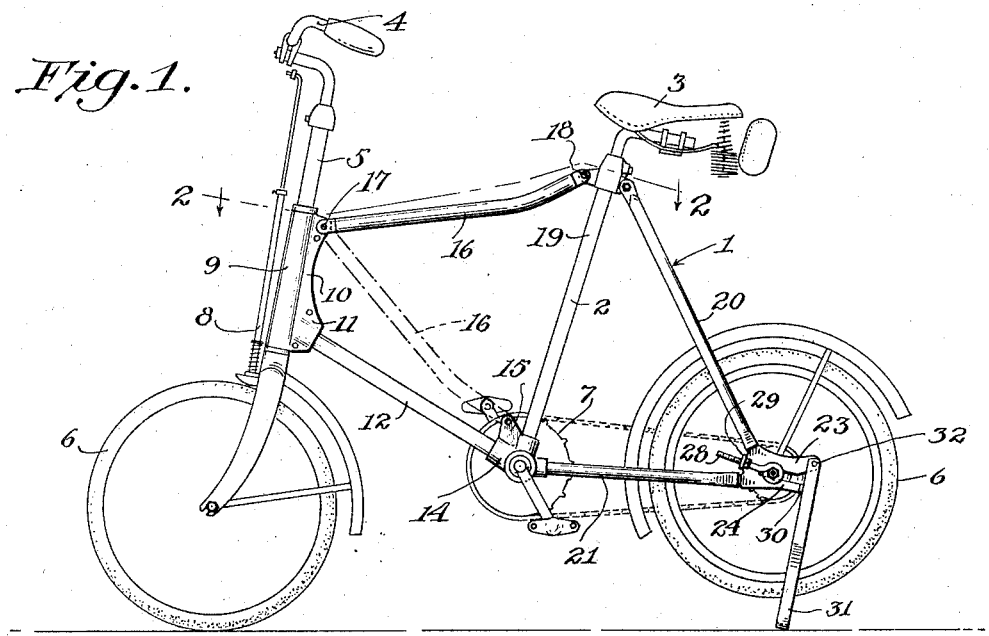
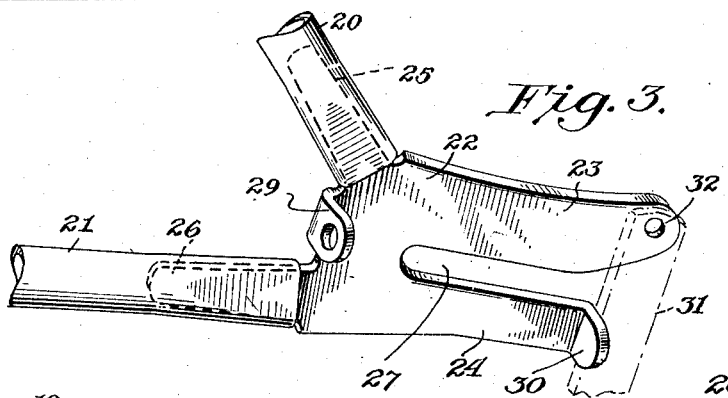
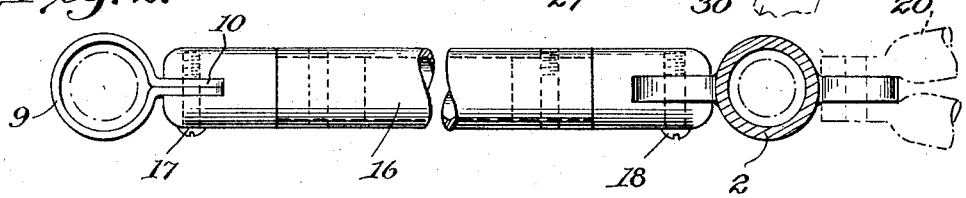
Inventor
Joseph L. Schwartz
Eccleston + Eccleston
Attorneys Patented Jan. 21, 1930

1,744,417

UNITED STATES PATENT OFFICE

JOSEPH LEON SCHWARTZ, OF PHILADELPHIA, PENNSYLVANIA, ASSIGNOR TO SIDWAY-TOPLIFF COMPANY, OF WASHINGTON, PENNSYLVANIA

SIDEWALK BICYCLE

Application filed March 9, 1927. Serial No. 173,961.

This invention relates to sidewalk bicycles, that is, bicycles having relatively small front and rear wheels and adapted for children's use on sidewalks, and has for its primary object to so modify prior known structures as to facilitate the manufacture thereof as well as to reinforce the structure at the most advantageous points.

A further object of the invention resides in the provision of a boy's sidewalk bicycle which is readily convertible to use for girls, and in which the means for effecting the conversion of the bicycle also serves to reinforce the framework thereof.

Another object of the invention consists in the provision of a novel and inexpensive construction by which the bicycle frame is supported on the rear axle of the device and which also serves as a pivot and brace for the bicycle stand or bracket.

Other objects and advantages of the invention will be apparent from the following description when taken in connection with the accompanying drawing; in which Figure 1 is a side elevation of the sidewalk bicycle.

Figure 2 is a horizontal sectional view taken on line 2—2 of Figure 1; and

Figure 3 is a perspective view of the means by which the bicycle frame is associated with the rear axle of the bicycle.

Referring to the drawing more specifically the numeral 1 indicates generally a sidewalk bicycle provided with a frame 2, seat 3, handle bars 4, steering column 5, wheels 6, operating gear 7 and brake 8.

Surrounding the lower portion of the steering column 5 is a sleeve 9 formed of a sheet of metal which is shaped to provide in addition to the sleeve a reinforcing web 10 formed by riveting the edges of the sheet together. This web 10 is expanded to provide a socket portion 11 in which is received one end of the lower bar 12 of the bicycle frame.

The socket member 14 in which the opposite end of the bar 12 is secured is also provided with additional sockets for the reception of other parts of the frame and the driving axle and is of conventional construction except that it is reinforced by means of a web or finger 15 which has an additional function to be now described.

The upper bar 16 of of the bicycle frame is pivoted to the web 10 as indicated by numeral 17 and has its opposite end detachably connected to the rearwardly inclined bar 19 of the frame adjacent the seat 3 as indicated by numeral 18. When this bar is in the position shown in full lines in Figure 1 it forms a brace for the upper part of the frame so as to better withstand the rough usage to which it is liable to be subjected by boys. When, however, the bicycle is to be used by girls it is desirable to remove the bar 16 so as to avoid interference with their skirts etc., and under such circumstances the bar is detached at its rear end from the main frame and swung downwardly to the dotted line position where it is bolted to the web 15. By this operation the bicycle is readily converted to use by girls and the bar 16 in its new position also reinforces the frame although perhaps not to the same extent as when in horizontal position.

For the purpose of uniting the rear frame members 20 and 21 and for mounting the same on the rear axle of the bicycle I provide metal stampings 22 having the rearwardly extending prongs 23 and 24 and the forwardly extending fingers 25 and 26. The fingers 25 and 26 are received in the lower ends of the tubular members 20 and 21 respectively and may be permanently secured thereto by spot welding or other preferred means. The rearwardly extending prongs 23 and 24 provide a slot 27 in which an end of the axle for the rear wheel is received, and its position therein is adjusted by means of a screw 28 which extends through a lug 29 integrally formed on the stamping 22. This adjustment of course, serves to place the desired tension on the sprocket chain of the driving gear 7.

Also formed on the stamping 22 is a lug 30 which serves as a stop for the stand or bracket 31 which is pivoted to the upper prong 23 as indicated by numeral 32. Two of these stampings 22 are of course provided for each bicycle but inasmuch as their construction is identical only one has been shown in the drawing. They are readily stamped out of sheet metal and therefore provide an economical yet durable construction by which the frame may be mounted on the rear axle as well as providing a mounting for the chain tightener and a pivot and stop for the bicycle bracket or stand.

From the foregoing description it will be apparent to those skilled in the art that I have devised a novel type of sidewalk bicycle which is strong and durable in operation, and of relatively low cost; that the device is readily convertible for use by boys or girls; that the frame is suitably reinforced in either form to which it is converted; that one of the elements entering into the convertibility of the bicycle serves as an additional reinforcement for the frame; and that the entire construction is such as to permit of its ready assemblage thereby further aiding in reducing the cost of production.

In accordance with the patent statutes I have described what I now believe to be the best embodiment of the invention, but I do not wish to be understood thereby as limiting myself or the scope of the invention as many changes and modifications may be made without departing from the spirit of the invention; all such I aim to include within the scope of the appended claim.

What I claim as new and desire to secure by Letters Patent is:

In a bicycle frame including upper and lower bars and a rearwardly inclined bar, a duplex socket member in which the adjacent ends of the lower bar and the rearwardly inclined bar are mounted, a flat metal web disposed between the sockets of said member and integrally connecting said sockets throughout their length to reinforce the same, means for pivotally mounting one end of the upper bar, the free end of said last-named bar and the web being provided with apertures, and a fastening element to enter said apertures to anchor the upper bar to said web when the bar is swung about its pivot to its lowermost position.

JOSEPH LEON SCHWARTZ.